United States Patent
Bradley

[15] 3,654,447
[45] Apr. 4, 1972

[54] ELECTRONIC INSTRUMENTATION SYSTEM FOR CATALYTIC CYANOGEN CHLORIDE TRIMERIZATION

[72] Inventor: Claude G. Bradley, Baton Rough, La.
[73] Assignee: Geigy Chemical Corporation, Greenburgh, N.Y.
[22] Filed: Apr. 23, 1970
[21] Appl. No.: 31,267

[52] U.S. Cl. .................. 235/151.12, 23/230 A, 23/253 A, 23/288 M, 444/1
[51] Int. Cl. ........................................................ G06g 7/58
[58] Field of Search ................. 235/150.1, 151.12, 151.3; 23/230 A, 253 A, 288 M, 288; 260/248 C, 698–700

[56] References Cited

UNITED STATES PATENTS

| | | |
|---|---|---|
| 3,275,809 | 9/1966 | Tolin et al. .......................... 235/151.12 |
| 3,079,079 | 2/1963 | Phister, Jr. et al. .................. 235/150.1 |
| 3,296,097 | 1/1967 | Lupfer ............................. 235/150.1 X |
| 3,321,280 | 5/1967 | Trotter, Jr. et al. ............. 235/151.12 X |
| 3,428,528 | 2/1969 | Oglesby, Jr. et al. ........... 235/151.12 X |
| 3,539,565 | 11/1970 | Evers et al. ......................... 260/248 C |

Primary Examiner—Joseph F. Ruggiero
Attorney—Davis, Hoxie, Faithfull & Hapgood

[57] ABSTRACT

Cyanogen chloride is trimerized to form cyanuric chloride in an exothermic reaction performed in a reaction chamber by passing the cyanogen chloride through tubes packed with an activated carbon catalyst. A plurality of spaced temperature responsive transducers are disposed within the reaction chamber, and supply analog output temperature information which is converted to digital form and registered in a digital computer.

The computer determines the continuous temperature-reaction distance function by employing a regression program to fix coefficients for a predetermined temperature distribution function employing linear, square, and exponential component terms. Information characterizing the operational status of the reaction, such as the peak temperature value and its location, is determined from the temperature function.

18 Claims, 3 Drawing Figures

ELECTRONIC INSTRUMENTATION SYSTEM FOR CATALYTIC CYANOGEN CHLORIDE TRIMERIZATION

This invention relates to chemical process instrumentation and, more specifically, to an electronic arrangement including stored program controlled digital apparatus for determining temperature dependent parameters characterizing the operational status of a cyanogen chloride trimerization chamber.

Cyanuric chloride (2,4,6,-trichloro,1,3,5-triazine) has heretofore found wide utility, for example, in the synthesis of dyestuffs, pharmaceuticals, herbicides, explosives and surfactants. One known method for preparing cyanuric chloride is to trimerize cyanogen chloride in the presence of an activated charcoal catalyst in accordance with the reaction This reaction may be effected by passing dried, gaseous cyanogen chloride through tubes packed with the carbon catalyst.

The trimerization reaction is strongly exothermic. I have discovered that the continuous (nonlinear) temperature distribution along the reaction path length may be employed to yield important information characterizing the operational status of the reaction. This data, in turn, may be used to control the reaction. For example, the peak temperature point for the trimerization process is initially disposed near the cyanogen chloride input port and progresses slowly toward the output port as the catalyst material nearest the input port becomes less effective. When the normally slow rate of travel for the peak temperature becomes at all rapid, an operational difficulty is signaled. By stopping the process and curing the fault at an early indication of such an increased peak point travel rate, inactivation of valuable catalyst may be avoided.

Another useful element of information which may be obtained is the width of the normally peaked temperature distribution function. When the distribution function broadens, a fault condition is again indicated and remedial action can be taken.

It is therefore an object of the invention to provide a method and apparatus for controlling a cyanogen chloride trimerization reaction in response to temperatures measured along the length of the reaction.

It is another object of the present invention to provide improved electrical instrumentation for chemical processing.

More specifically, an object of the present invention is the provision of a composite transducer, analog signal processing, and on-line digital processing arrangement for implementing real time process monitoring employing information derived from a temperature distribution measured and computed along a cyanogen chloride trimerization reaction column.

The above and other objects of the present invention are realized in a specific, illustrative process instrumentation arrangement employing temperature transducers, e.g., thermocouples, spaced along a reaction column wherein cyanogen chloride is trimerized to form cyanuric chloride as it flows through a carbon catalyst. The analog thermocouple signals are sampled, converted to digital form, and entered in a plurality of storage locations in a stored program controlled digital computer.

The computer is adapted to examine the digital temperature variables, and identify the discrete temperature monitoring column position reporting the highest temperature value. For each temperature sensing position, the computer determines a series of particular linear, square, and exponential functions which I have found describe the temperature-reaction distance relationship. These functions depend upon the reaction distance, i.e., the distance from the cyanogen chloride input port, and upon the distances from the highest monitored temperature reading and from its two adjacent monitoring locations.

This information is then operated upon by a regression program which determines the coefficients for the aforementioned temperature-reaction distance relationship, thereby definitively specifying the relationship as a continuous function of reaction length. Thereafter, derived information of interest, e.g., the location of the peak temperature and the sharpness of the typically skewed temperature function, is obtained.

The above and other objects of the present invention are realized in a specific illustrative embodiment thereof, described hereinbelow in conjunction with the accompanying drawing, in which.

Figure 1:
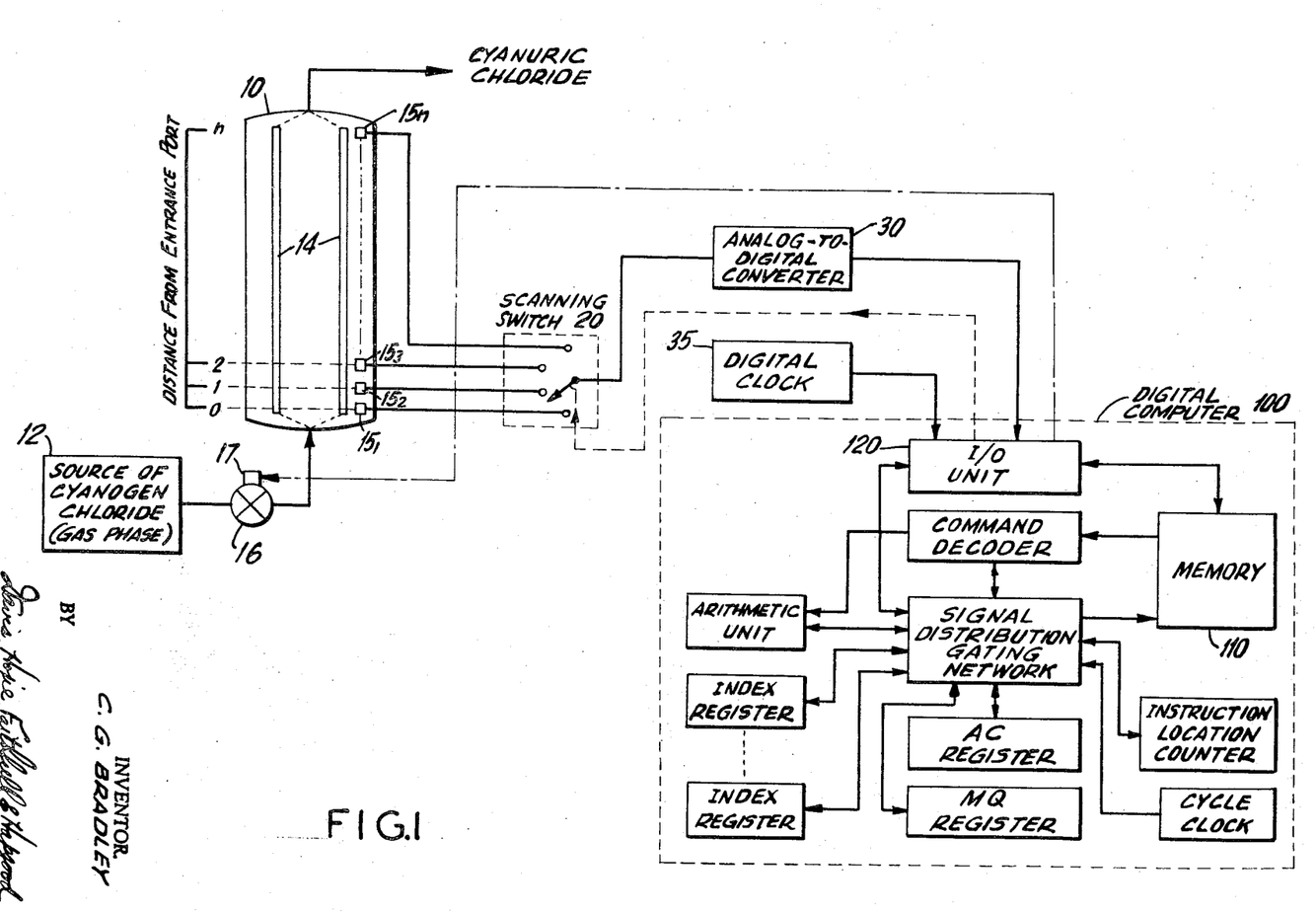
FIG. 1 schematically depicts an illustrative instrumentation arrangement for a cyanogen chloride trimerization process which embodies the principles of the present invention.

Referring now to FIG. 1, there is shown a reaction chamber 10 which includes a plurality of conduits or tubes 14 which are packed with a carbon catalyst. Gaseous cyanogen chloride is supplied from a source 12 to the reactor 10 and, more specifically, to the tubes 14. As described above, the cyanogen chloride trimerizes in the tubes 14 to form cyanuric chloride which leaves the distant or upper end of the reaction chamber 10.

A plurality of temperature measuring transducers 15, e.g., thermocouples, are disposed at regular intervals along the length of the reaction chamber 10 from input to output thereof. The transducers can be mounted within the chamber 10 between the rods 14, or may be secured on or penetrate within one or more of the rods.

The temperatures sensed by each of the transducers $15_1$–$15$ are represented by the amplitude of an analog (continuous) signal output, the thermocouples being connected in any well known electrical circuit configuration, e.g., a bridge circuit or voltage divider, to develop the requisite signals.

The array of $n$ temperatures manifested by the output signals of the transducers are converted to digital form, and stored in a group of n storage locations in a memory 110 of a digital computer 100, e.g., the IBM 1800. For program compilation purposes, and in the discussion below, the digital replicas of the outputs of transducers $15_1$–$15_n$ (and interchangeably the storage locations containing these values) are denoted by the vector terms $Y(1)$ through $Y(N)$. For concreteness, and without limitation, it will henceforth be assumed that there are twenty transducers 15 ($n$=20) spaced equidistant from each other at one foot intervals such that the storage locations range from $Y(1)$ through $Y(20)$.

To this end, the analog transducer outputs are sequentially connected to an analog-to-digital converter 30 by a scanning switch 20 shown schematically in the drawing. The switch 20 may illustratively comprise a mechanical or reed stepping switch, or an electronic structure such as a plurality selectively gated field effect transistors. The output at the common terminal of the scanning switch 20 is then converted to digital form by the analog to digital converter 30. The twenty digitized temperature values are then registered in memory 110 under control of a computer input/output unit 120 in any conventional manner. The equipment items 20, 30, 100 are readily commercially available, as from International Business Machines Corporation or Digital Equipment Corporation. Alternatively, the analog temperature outputs may be converted to digital form and registered in memory under stored program control operable in conjunction with peripheral computer hardware. One such program, identified by the call name PROSPRO, is sold by International Business Machines Corporation.

With the trimerizing reaction in the process and stabilized, the temperature signals from the transducers $15_1$–$15_{20}$ are registered in the memory locations $Y(1)$–$Y(20)$ as above described. By way of a general overview of information processing in accordance with the present invention, the first objective is to obtain a continuous mathematical expression for the trimerization chamber temperature $Y(x)$ as a function of distance $(x)$ along the vertical column reaction length, the zero distance point being the cyanogen entrance port to the catalytic rods 14, i.e., at the location of the bottom transducer 15. This continuous temperature function must be determined from the array of discrete temperature values. To this end, I have discovered that the temperature distribution $Y(x)$ can be derived by assuming a temperature distribution function $$Y(x) = a_1 + a_2x + a_3x^2 + a_4e^{-(x-xmax)^2/c} + a_5e^{-(x-xmax)^2} + a_6e^{-(x-xmp1)^2} + a_7e^{-(x-xm11)^2/c}$$

Equation (1)

which may be rewritten $$Y(x) = a_1 + a_2F_1(x) + a_3F_2(x) + a_4F_3(x) + a_5F_4(x) + a_5F_4(x) + a_6F_5(x)a_7F_6(x)$$

Equation (2)

where the coefficients $a_1$–$a_6$ are unknown and depend upon the input temperature data;

xmax is the location of the transducer 15 reporting the highest column temperature;

xmpl (xmax plus 1) is the location of the transducer adjacent to the xmax reporting unit in the downstream process direction (upward for the assumed case);

xmll (xmax less 1) is the location of the transducer 15 adjacent to the xmax unit in a direction nearer the cyanogen input port (downward in FIG. 1); and $c$ is a scaling constant less than one – 0.5 has been found a desirable value and is used hereinbelow.

Figure 2:
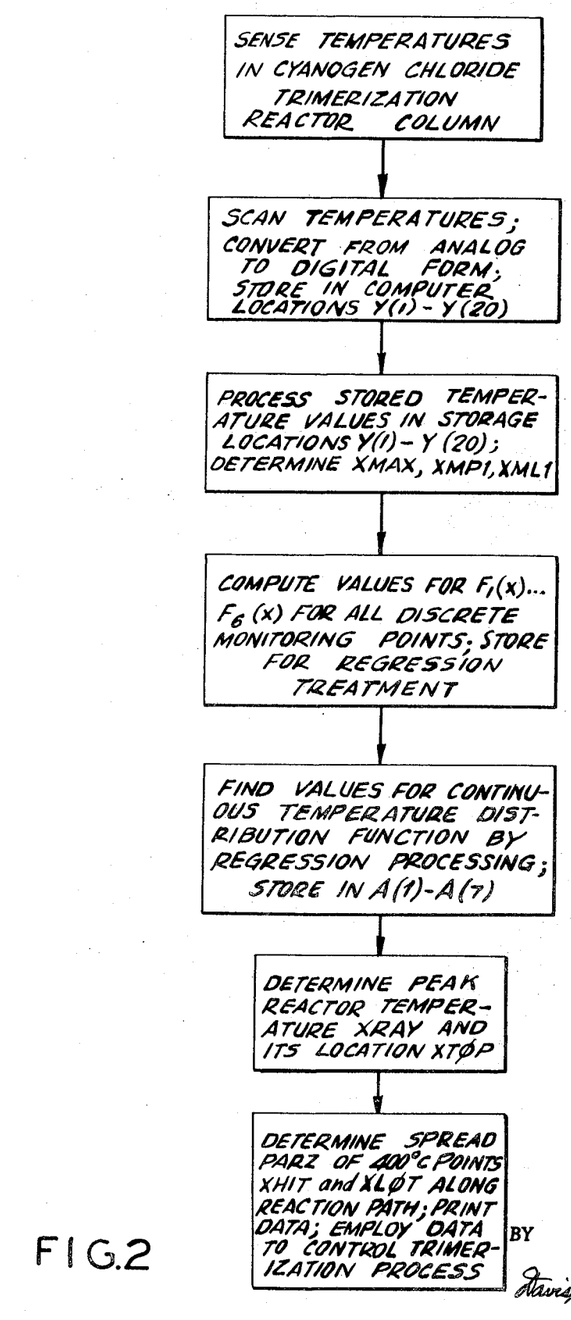
FIG. 2 is a flow chart illustrating the data processing sequence of operations for the FIG. 1 arrangement.

Continuing with the overview, and as set forth in the basic information processing flow chart of FIG. 2, the computer first determines the location of xmax, and xmpl and xmll readily follow from xmax. Next, the variable distance-dependent portion of the right side expressions of Equation (1) are computed for all discrete $x$, in this case for integer $x$ running from 0 through 19. That is, the expressions $x_1, x^2, F_3(x),.... F_6(x)$ are determined for all integer $x$ within the range.

The computer then derives the values of the $n$ coefficients $a_1,....a_7$ to completely determine the temperature distribution function for the reaction, this being done by a coefficient regression process. That is, the computer determines values for $a_1,...., a_7$ such that the continuous temperature-distance relationship will obtain at all sampling points within prescribed standards. Mathematically stated, coefficients are computed to best satisfy the matrix relationship $$\begin{bmatrix} Y(1) \\ Y(2) \\ , \\ , \\ , \\ Y(20) \end{bmatrix} = a_1 + a_2 \begin{bmatrix} X_0 \\ X_1 \\ , \\ , \\ , \\ X_{19} \end{bmatrix} + a_3 \begin{bmatrix} X_0^2 \\ X_1^2 \\ , \\ , \\ , \\ X_{19}^2 \end{bmatrix} + \ldots + a_7 \begin{bmatrix} F_6(0) \\ F_6(1) \\ , \\ , \\ , \\ F_6(19) \end{bmatrix}$$

Equation (3).

With the complete temperature distribution thus known, various derived parameters of interest as characterizing the operational state of the trimerization process are determined. For example, the peak reaction temperature, and its location, are found by examining the distribution function between xmpl and xmll as bounds. Further, the width (measured along the reaction path) of the skewed and peaked temperature function at a level of interest, e.g., 400° C., is determined by geometric projection. Finally, limit tests of interest may be made on the derived information to determine the operational status of the monitored reaction.

With the above general processing overview in mind, specific illustrative coding sequences which perform the above operations will now be considered. The FORTRAN compiler language is employed for purposes of illustration, but it is to be understood that other well known compiler, assembly, and direct machine languages may be employed to cause like or equivalent computing machine operation.

To find the location XMAX of the highest reported temperature the following FORTRAN statements may be employed:

```
         TMAX = Y(1)                    (1)
         DΦ 15 II = 1,20                (2)
         IF ( Y(II)-TMAX) 15,16,16      (3)
   16    TMAX = Y(II)                   (4)
         XMAX = II-1                    (5)
   15    CONTINUE                       (6)
``` where

II is a dummy running indexing variable for the DO loop (statements (2)–(6)); and TMAX is a storage location (and a variable name) which contains the highest temperature encountered during computer examination of the reported temperatures $Y(1)$–$Y(20)$ in sequence.

Examining the computation effected by the above FORTRAN statements, the contents of location $Y(1)$, viz., the temperature sensed by the transducer $15_1$, is first loaded into TMAX which thus initially (and provisionally) assumes that $Y(1)$ is the highest temperature in the reaction chamber 10. TMAX could as well be initialized to any value less than the peak reading, including zero. Statement (2) initiates a so-called "DO loop." As a general matter, a statement sequence of the form

```
         DO 200 M = N,NN,J
         —
         —
   200   —
``` gives rise to repeated execution of the statements between the DO statement and that identified by the label ("200"), with a running index variable M starting with a value N (positive) and increasing toward the NN value on each successive past through the statement array with an increment J, J automatically being 1 if omitted. For the present program, the DO statement (2) thus causes statements (3)–(6) to be executed twenty times with a running variable II starting at 1 and increasing by one each successive pass until the final value of twenty is reached and processed.

Statement (3) is a branching test, and is of the general form

IF (A–B) 100, 200, 300 which indicates that the program is to transfer for the next operation to a statement identified by a label 100, 200, or 300 if the expression (A–B) is negative, zero, or positive, respectively. Thus, statement (3) above skips directly to the loop ending CONTINUE statement (6) to end a DO loop pass if the previously encountered highest sensed temperature stored in TMAX is higher than the temperature Y(II) from sensor $15_i$ which is examined during the $i$th pass through the loop. This action follows from the expression (Y(II)–TMAX) being negative, and label 15 corresponding to the CONTINUE statement.

Corresponding, if a temperature Y(II) is greater than TMAX indicating that Y(II) is the highest temperature reported of those yet examined, the statement labeled 16 is executed to update TMAX to Y(II). Further XMAX (the location of the highest encountered temperature) is set equal to II-1 since there is an inherent difference of one between temperature and its corresponding location, i.e., Y(I) is reported from transducer $15_{(I)}$ spaced I-1 feet from the cyanogen chloride input port.

After statements (1)–(6) are executed, the storage locations TMAX and XMAX will thus respectively contain the highest discrete temperature reported, and its corresponding distance from the input catalyst rod end after the DO loop has been satisfied (i.e., executed twenty times) whereupon the computation proceeds.

The values for xmpl and xmll are directly obtainable from XMAX, as by

XMP1=XMAX+1.0                (7)
    XML1=XMAX-1.0                (8)

where XMP1 and XML1 are storage memory locations for xmpl and xmll, respectively.

While the FORTRAN statements are consecutively numbered herein, it is appreciated that they need not be consecutive, and likely would not be in a source program. There may be input/output and/or administrative statements between any such statements or statement-groups. Further, the entire processing flow is advantageously under control of any well known executive program, e.g., the IBM TSX program.

The values of $F_1(0)-F_1(19)$, $F_2(0)-F_2(19)$ ... $F_6(0)-F_6(19)$ need next be determined as an input to the regression routine. This is effected by the following coding:

DO 20 JJ=1,20                (9)

I=JJ-                        (10)

F1(I)=I                      (11)

F2(I)=I**2                   (12)

F3(I)=EXP(-(I-XMAX)**2/0.5)  (13)

F4(I)=EXP(-(I=XMAX)**2)      (14)

F5(I)=EXP(-(I-XMP1)**2)      (15)

F6(I)=EXP(-(X-XML1)**2/0.5)  (16)

wherein

F1(I) corresponds to $F_1(x)$ or $x$,

F2(I) corresponds to $F_2(x)$, or $x^2$, and so forth (see Equations (1) and (2), supra).

In FORTRAN symbology, the double asterisk represents an exponential, i.e., $I**2=I^2$; a single asterisk signifies multiplication; a slash division; and EXP(X) signals $e^x$ where $e$ is the number whose natural logarithm is one. With these definitions in mind, it is clear that instructions (9)–(16) compute values for $F_1(x)-F_6(x)$ for each of the 20 monitoring points, and store this information in 120 storage locations identified by F1(0)–F1(19), F2(0)–F2(19), ..., F6(0)–F6(19). This data (i.e., specific digital numbers) corresponds to that of the matrices on the right side of Equation (3). Statement (10) is used to convert the DO loop index JJ, which must start from the positive number (as 1) and therefore exhibits a range 1-20, to a running variable I on the desired range 0-19 to conform to transducer distances from the input port.

Figure 3:
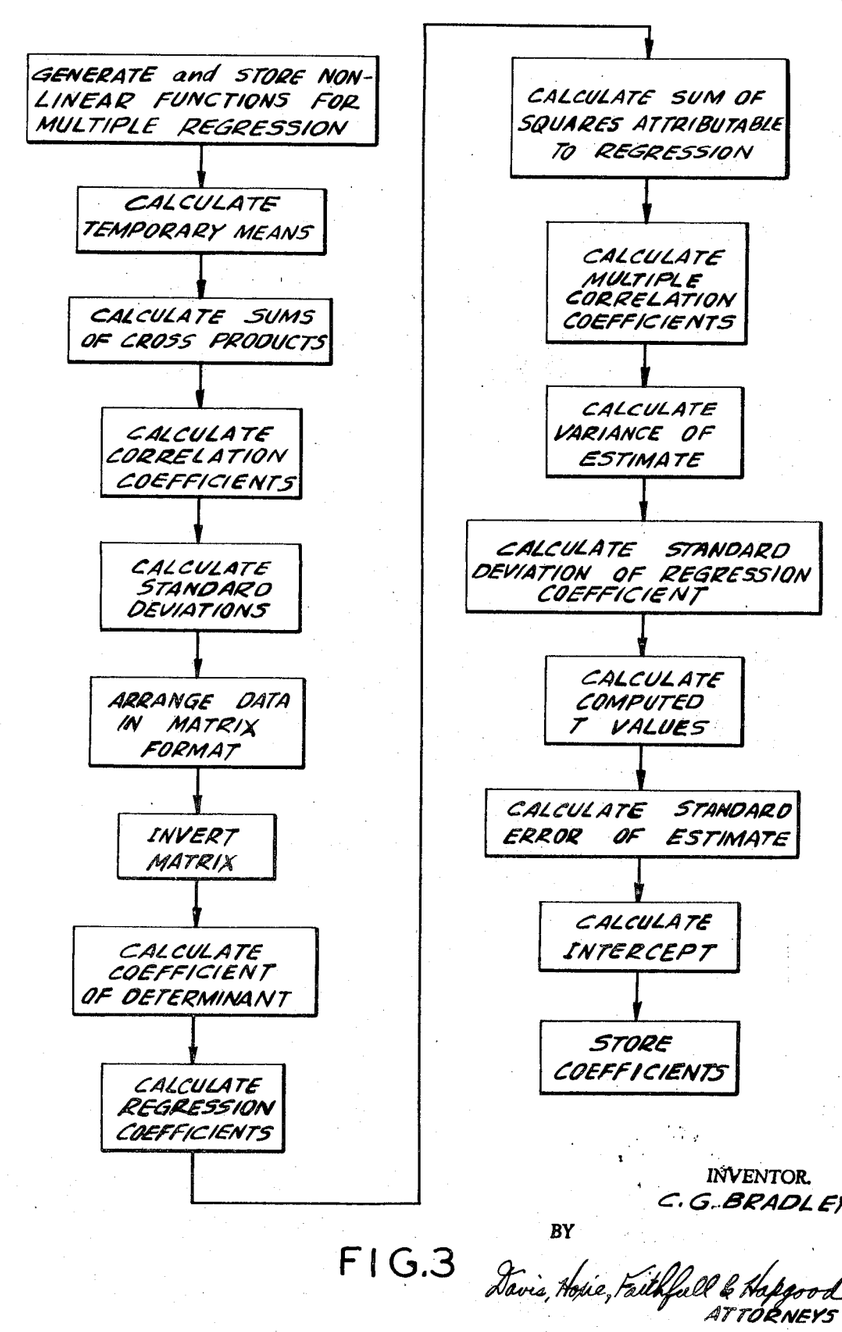
FIG. 3 depicts a flow chart for an illustrative regression program for the processing of FIG. 2.

The next processing step is to determine the coefficients $a_1$, ... $a_7$ and this is done by any standard regression routine known to those skilled in the art. One such program, identified by the call name REGRY, is available from International Business Machines Corp., and a flow chart for this regression program is disclosed in FIG. 3. The above-identified or other regression program is operative to make the best possible selection of a set of coefficients $d$ which most closely satisfy a set of conditions expressible as $$\begin{bmatrix} y_1 \\ , \\ , \\ , \\ y_n \end{bmatrix} = d_1 + d_2 \begin{bmatrix} p_1 \\ , \\ , \\ , \\ p_n \end{bmatrix} + d_3 \begin{bmatrix} q_1 \\ , \\ , \\ , \\ q_n \end{bmatrix} + \ldots d_m \begin{bmatrix} s_1 \\ , \\ , \\ , \\ s_n \end{bmatrix}$$

Equation (4)

Again in the context of the present application (where $d_1=a_1$, ..., $d_7=a_7$), it is the coefficients $a_1-a_7$ of the temperature function (Equation (1) which are computed, and stored in a plurality of memory locations, e.g., A(1), A(2), ... A(7). Once the coefficients $a_1-a_7$ have been computed, the continuous temperature distribution $Y(x)$ for the trimerization reaction is completely determined. Thus, the values in A(1)–A(7) may be printed out, and/or the temperature distribution may be automatically plotted.

To find the location (XRAY) for the hottest point in the reaction column by examining the temperature function in small discrete steps (e.g., of 0.1 foot) starting at xml1 and proceeding toward xmp1, the following illustrative coding may be employed:

XINC=0.1                                     (17)

XRAY=0.0                                     (18)

DO 444 JK=1,20                               (19)

I=JK-                                        (20)

X(I)=XML1+XINC*I                             (21)

FF1(I)=X(I)                                  (22)

FF2(I)=X(I)**2                               (23)

FF3 (I)=EXP(-(X(I)-XMAX**2/0.5)              (24)

FF4(I)=EXP(-(X(I)-XMAX)**2)                  (25)

FF5(I)=EXP(-(X(I)-XMP1)**2))'26)

FF6(I)=EXP(-(X(I)-XML1)**2/0.5)              (27)

YY(I)=A(1)+A(2)*FF1(I)+A(3)*                 (28)
      FF2(I)+A(4)*FF3(I)=A(5)*51
      FFY(I)+A(6)*FF5(I)+A(7)*
      FF6(I)

IF (YY(I)-XRAY) 444, 444, 172                (29)
172
    XRAY=YY(I)                                   (30)

XTOP=X(I)                                    (31)
444
    CONTINUE                                     (32)

wherein XINC specifies a 0.1 foot testing interval; YY(I) is the temperature at a specified testing point along the reaction length; and XRAY and XTOP are the maximum column temperature, and the position along the reaction length measured from the cyanogen chloride input port where that temperature occurs, respectively.

Statement (17) is definitional of XINC as being 0.1 foot; and statement (18) initializes XRAY to some value less than the expected peak value, e.g., to zero. Statements (19) and (32) bound a DO loop wherein the testing location varies in the interval between XML1 and XMP1, i.e., between xml1 and xml1+20 (0.1). As seen from statement (21), the testing location X(I) starts at XML1 (JK=1 and I=0), and on the final DO loop pass is at XML1+1.9 feet (0.1 foot below xmp1).

Statements (21)–(27) compute $F_1(x)-F_6(x)$ during each pass, and YY(I) of statement (26) stores the computed temperature at the testing point. Statements (29)–(32) operate in the manner described above regarding the search for XMAX to make the contents of XRAY equal to the largest (YY(I) encountered, i.e., the highest temperature encountered on the 20 DO loop passes, with XTOP being set to the location of the peak temperature. The XRAY and XTOP parameters comprise valuable information characterizing the trimerization process, and are printed out via PRINT and FORMAT statements. They may also be compared with norms, or previous readings to signal an alarm if the norm limits are exceeded, or if a rate of change is excessive.

As another figure of merit for the reaction chamber, I have found it desirable to determine the width of the peaked temperature function in the area of XTOP at some relatively high level, e.g., 400° C. This may be accomplished on the positive sloping temperature function side before XTOP by searching the discrete temperature readings for the first value above 400° C., as by

DO 325 I=1,20                                (33)

IF (Y(I)-400.0) 325, 325, 326                (34)
325
    CONTInUE                                     (35)

which escapes from the DO loop with I embodying information to identify the first position reporting a temperature above 400° C. A variable XLOT corresponding to the reaction distance exhibiting the 400° C. temperature can then be approximated, assuming a straight line variation between Y(I−1) and Y(I) by $$XLOT=I-2+(400.0-Y(I-1)/Y(I)-Y(I-1)) \quad (36)$$

Alternatively, an incremental scan along the range I−2, I−1 may be employed to locate XLOT.

Correspondingly, and operating on the negative sloping curve beyond XTOP, the location XHIT of the upper 400° C. point along the reaction length may be found by $$K=I \quad (37)$$
$$DO\ 327\ I=K,20 \quad (38)$$
$$327\quad IF\ (400.0-Y(I))\ 327,327,328 \quad (39)$$
$$328\quad CONTINUE \quad (40)$$
$$XHIT=I-2+(Y(I-1)-400.0)/(Y(I-1)-Y(I))) \quad (41)$$

in a manner analogous to that given above, with I being preserved from the prior computation. Here, the DO loop index I is started at a value such that Y(I)>400.0, and the transfer from the DO loop is made responsive to the first incremental I such that Y(I)<400.0.

The linear catalytic reaction distance spread PARZ between the 400° points is then $$PARZ=XHIT-XLOT \quad (42)$$

As before, the spread PARZ may be printed out, automatically compared with a predetermined norm to signal an alarm if the norm is exceeded, or compared against a prior value or values to detect improper changes or rates of change.

As noted above, the information derived from the computed temperature distribution function may be employed to directly control the trimerization process if an alarm condition is detected. For example, the computer input/output unit can signal a controller 17 of any known construction, e.g., a vane actuating solenoid, to close a valve 16, and thus stop the input flow of cyanogen chloride to the reactor 10 if a proper operating bound is exceeded, thereby preventing possible continuing inactivation of the catalyst.

For the above processing, a digital measure of time, as from a digital clock 35, is supplied to the computer and stored in memory, as in a location CLOK, Then also, bounds for the maximum acceptable rate of travel of the peak temperature (PTRV) and the maximum proper temperature distribution spread at the 400° C. level (PARM) are defined.

By way of further initialization, a valve control variable IVLC is set to some initial state, e.g., zero, as by $$IVAC = 0 \quad (43)$$

the computer input/output unit signaling the controller 17 to open the valve 16 for free gas flow therethrough when IVLC equals 0, and to close the valve when IVLC equals 1. Further, instructions such as $$XTPP=XTOP \quad (44)$$
$$CLCP=CLCK \quad (45)$$

are included following the testing statements given below to preserve the value XTOP from the previous process monitoring run in a location XTPP, and to preserve the time of the previous reactor monitoring cycle in a location CLCP.

System processing to close the valve 16 by setting IVLC=1 if either bound is exceeded is performed by $$DELX=XTOP-XTPP \quad (46)$$
$$DELT=CLCK-CLCP \quad (47)$$
$$RATX=DELY/DELT \quad (48)$$
$$IF\ (PTRV-RATX)\ 400,400,402 \quad (49)$$
$$IF\ (PARM-PARZ)\ 400,400,402 \quad (50)$$
$$400\quad IVLC=1 \quad (51)$$
$$402\quad - \quad (52)$$

Statements (46)–(48) determine a variable RATX corresponding to the average rate of travel of XTOP for the most recent two reactor monitoring cycles. If this rate (RATX) exceeds the maximum permissible rate (PRTV), branching statement (49) is negative and sets IVLC to 1 to close the valve 16. Similarly, statement (50) closes the valve 16 is the spread PARZ exceeds the maximum bound PARM.

The internal components of the computer 100 which carry on the above operation in accordance with an object program complied from the above FORTRAN source program are shown in FIG. 1 merely to illustrate the constituents of a typical, conventional stored program controlled digital computer. The operation of these elements are well known per se, and in conjunction with a stored program. For a detailed discussion in the regard see, for example, G. M. Amdahl et al. U.S. Pat. No. 3,400,371 or British Pat. No. 875,695.

The instrumentation arrangement of FIG. 1 has thus been shown by the above to automatically determine the continuous temperature function along the reaction length of the column for trimerizing cyanogen chloride into cyanuric chloride. The procedure operates on a set of discrete, spaced, measured values, and computes derived parameters from the temperature function to characterize the operational status of the reaction. Moreover, the trimerization reaction is controlled by the derived parameters.

The above arrangement is merely illustrative of the principles of the present invention. Numerous modifications and adaptations thereof will be readily apparent to those skilled in the art without departing from the spirit and scope thereof.

What is claimed is:

1. In combination, a reaction chamber for trimerizing cyanogen chloride to form cyanuric chloride, a carbon catalyst included within said reaction chamber and disposed along a reaction length along which the cyanogen chloride and the formed cyanuric chloride flow between reaction chamber input and output ports, a plurality of temperature transducers spaced along said reaction length to provide a measure of the reaction temperature sensed thereby, a digital computer including memory means, means for registering said sensed temperatures in said computer, means for storing a predetermined temperature distribution function comprising a plurality of reaction length dependent functions and at least one undetermined coefficient, and regression means operative in conjunction with said registered temperatures and said stored distribution function for determining said coefficient to completely specify said temperature distribution function.

2. A combination as in claim 1 further comprising means for determining the peak temperature value of said temperature distribution function, and means for storing said peak value in said computer.

3. A combination as in claim 2 further comprising means for determining the distance along said reaction length where said peak temperature value occurs, and means for storing said distance in said computer.

4. A combination as in claim 3 further comprising means for controlling said trimerization reaction responsive to the rate of travel of said peak temperature along said chamber.

5. A combination as in claim 1 further comprising means for determining the length along said reaction length along which said temperature exceeds a predetermined level, and means for storing said length in said computer.

6. A combination as in claim 5 further comprising means for controlling said trimerization reaction responsive to the rate of travel of said peak temperature along said chamber.

7. A combination as in claim 1 wherein said predetermined temperature distribution $Y(x)$ comprises $$Y(x) = a_1 + a_2 x + a_3 x^2 + a_4 e^{-(x-xmax)2/c} + a_5 e^{-(x-xmax)2} + a_7 e^{-(x-xm l1)2/c} + a_8 e^{-(x-xm pl)2}$$

where $a_1$–$a_6$ are initially undetermined coefficients, $x$ is distance along said reaction length, $xmax$ is the location of the highest temperature sensed by said transducers, $xml1$ and $xmp1$ are the locations of the transducers adjacent the $xmax$ reporting location closer to and remote from said reaction chamber input port, respectively, and $c$ is a constant less than one.

8. A combination as in claim 7 further comprising means for determining $xmax$, $xml1$ and $xmp1$, and for storing these values in said computer memory means.

9. A combination as in claim 8 further comprising means for determining the peak temperature value of said temperature distribution function, and means for storing said peak value in said computer.

10. A combination as in claim 9 further comprising means for determining the distance along said reaction length where said peak temperature value occurs, and means for storing said distance in said computer.

11. A combination as in claim 8 further comprising means for determining the length along said reaction length along which said temperature exceeds a predetermined level, and means for storing said length in said computer.

12. A combination as in claim 1 further comprising means for deriving parameters from said temperature distribution function characterizing the operational status of said trimerization reaction, and means responsive to the value of said derived parameters for controlling said reaction.

13. A combination as in claim 12 wherein said controlling means includes valve means connected to said chamber input port, and means for actuating said valve means.

14. A method for monitoring the operational status of a trimerization process wherein cyanogen chloride is passed through a carbon catalyst disposed along a reaction length to form cyanuric chloride, comprising measuring the temperatures obtaining at spaced points along said reaction length, registering said measured temperature values in a digital computer, storing a predetermined continuous temperature distribution having at least one undetermined coefficient therein, said distribution being a function of reaction length, computing said distribution function at spaced points along the reaction length corresponding to the locations where the reaction temperature is measured, storing these computed values in said computer, and determining said initially undetermined coefficient from said stored values of said reaction length dependent functions to completely specify said temperature distribution function.

15. The method as in claim 14 further comprising the step of determining the peak temperature of said distribution.

16. The method as in claim 15 further comprising determining the point along said reaction length where said peak temperature occurs.

17. The method as in claim 16 further comprising the step of determining the distance along said reaction length where said temperature distribution exceeds a predetermined level.

18. The method as in claim 14 wherein said distribution function computing operation includes the steps of computing the functions $$x, x^2, e^{-(x-xmax)2/c},$$
$$e^{-(x-xmax)2},$$
$$e^{-(x-xmp1)2}, \text{ and}$$
$$e^{-(x-xml1)2/c}$$

where $x$ is distance along the reaction length, $c$ is a constant less than one, $xmax$ is the location of the highest measured temperature, and $xmp1$ and $xml1$ are the temperature measuring locations adjacent to $xmax$.

* * * * *

PO-1050
(5/69)

UNITED STATES PATENT OFFICE
CERTIFICATE OF CORRECTION

Patent No. 3,654,447  Dated April 4, 1972

Inventor(s) CLAUDE G. BRADLEY

It is certified that error appears in the above-identified patent and that said Letters Patent are hereby corrected as shown below:

Col. 2, line 36, "$15_1\text{-}15$" should be -- $15_1\text{-}15_n$ --.

Col. 3, line 17 (Equation 2), delete "$a_5F_4(x)+$" second occurrance.

Col. 4, line 41, "PAST" should be -- PASS --.

line 51, "a" second occurrance, should be -- the --.

line 57, "$\underline{i}$th" should be -- i-th --.

line 61, "Corresponding" should be -- Correspondingly --

Col. 5, line 29, "20" should be on same line as coding 16.

line 68, "(Equation (1)" should be --(Equation (1)) --.

Col. 6, line 9, "I=JK-" should be I=JK-1 --.

line 19, delete "0'26)" after **2). Add -- (26) -- to right hand column.

line 22, delete "*51" after equation.

line 27, "172" to go before -- XRAY=YY(1) --.

line 31, "444" to be on same line as CONTINUE.

PO-1050
(5/69)

UNITED STATES PATENT OFFICE
CERTIFICATE OF CORRECTION

Patent No. 3,654,447　　　　　　　　　　Dated April 4, 1972

Inventor(s)　CLAUDE G. BRADLEY　　　　　　　- 2 -

It is certified that error appears in the above-identified patent and that said Letters Patent are hereby corrected as shown below:

Col. 6, line 72, "325" should be next to COnTINUE. Change "COnTINUE" to -- CONTINUE --.

Col. 7, line 16, "327" should be next to CONTINUE. Change "CONTINUE" to -- CØNTINUE --.

line 17, "328" should be next to -- XHIT --.

line 17, position parenthesis "))" at end of equation.

line 71, "RATX=DELY/DELT" should be -- RATX=DELX/DELT --.

line 75, "400" should be next to -- IVLC=1 --.

Col. 8, line 1, "402" should be next to -- -   --.

line 2, "-" should be --   ---   --.

line 9, "is" should be -- if --.

Signed and sealed this 9th day of January 1973.

(SEAL)
Attest:

EDWARD M. FLETCHER, JR.　　　　　　　　　ROBERT GOTTSCHALK
Attesting Officer　　　　　　　　　　　　Commissioner of Patents